(12) United States Patent
Yuvalaklioglu et al.

(10) Patent No.: US 10,399,187 B2
(45) Date of Patent: Sep. 3, 2019

(54) SYSTEM AND METHOD TO LOCATE AND REPAIR INSERT HOLES ON A GAS TURBINE COMPONENT

(71) Applicant: General Electric Company, Schenectady, NY (US)

(72) Inventors: Mustafa Yuvalaklioglu, Gebze (TR); Lawrence James Whims, Easley, SC (US); Daniel James Dorriety, Greenville, SC (US); Steven Charles Woods, Greenville, SC (US); Mark Carmine Bellino, Greenville, SC (US); James Carroll Baummer, Greenville, SC (US); Brian Leslie Henderson, Greenville, SC (US); Efe Bulut, Gebze (TR); Paul A. Cook, Greenville, SC (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 15/427,894

(22) Filed: Feb. 8, 2017

(65) Prior Publication Data

US 2018/0221999 A1 Aug. 9, 2018

(51) Int. Cl.
*B23P 6/00* (2006.01)
*B23K 9/028* (2006.01)
(Continued)

(52) U.S. Cl.
CPC ............ *B23P 6/002* (2013.01); *B23K 9/0284* (2013.01); *B23K 9/0288* (2013.01); *B23K 9/091* (2013.01);
(Continued)

(58) Field of Classification Search
CPC ........ B23P 6/002; B23P 2700/13; B23K 9/32; B23K 9/0288; B23K 9/091; B23K 9/125;
(Continued)

(56) References Cited

U.S. PATENT DOCUMENTS

| 4,237,361 | A | * | 12/1980 | Zwintscher | .............. | B23K 9/04 |
|           |   |   |         |            |               | 219/73.11 |
| 4,995,087 | A | * | 2/1991  | Rathi      | ................... | B23K 26/032 |
|           |   |   |         |            |               | 382/152 |

(Continued)

FOREIGN PATENT DOCUMENTS

| EP | 0 600 614 | 6/1994 |
| EP | 2618061   | 7/2013 |

(Continued)

*Primary Examiner* — Ryan J. Walters
(74) *Attorney, Agent, or Firm* — Nixon & Vanderhye P.C.

(57) ABSTRACT

A method to repair an opening in a metallic device including:
mount the device on a positioner; while the device is mounted on the positioner, sense and record positions of a surface of an opening in the device using a probe operated by a manipulator; based on the recorded positions determine a centerline and diameter of the opening; orient a digital model of the opening with respect to the opening of the device based on the centerline and diameter of the opening, and apply an weld or cladding to the opening by a welding torch maneuvered automatically by the manipulator while the device is mounted to the positioner and based on the oriented digital model of the opening.

20 Claims, 6 Drawing Sheets

(51) Int. Cl.
- *B23K 9/09* (2006.01)
- *B23K 9/12* (2006.01)
- *B23K 9/173* (2006.01)
- *B23K 9/23* (2006.01)
- *B23K 9/32* (2006.01)
- *B23K 101/00* (2006.01)
- *B23K 101/04* (2006.01)
- *B23K 103/18* (2006.01)

(52) U.S. Cl.
CPC .............. *B23K 9/125* (2013.01); *B23K 9/173* (2013.01); *B23K 9/23* (2013.01); *B23K 9/32* (2013.01); *B23K 2101/001* (2018.08); *B23K 2101/04* (2018.08); *B23K 2103/26* (2018.08); *B23P 2700/13* (2013.01); *F23R 2900/00019* (2013.01)

(58) Field of Classification Search
CPC ........ B23K 9/173; B23K 9/23; B23K 9/0284; B23K 2103/26; B23K 2101/001; B23K 2101/04; F23R 2900/00019
See application file for complete search history.

(56) References Cited

U.S. PATENT DOCUMENTS

| | | |
|---|---|---|
| 5,329,691 A | 7/1994 | Roberts et al. |
| 5,535,498 A | 7/1996 | Roberts et al. |
| 5,727,327 A | 3/1998 | Wakabayashi et al. |
| 7,134,287 B2 | 11/2006 | Belsom et al. |
| 8,842,273 B2 | 9/2014 | Berman et al. |
| 2006/0090336 A1 | 5/2006 | Graham et al. |
| 2007/0151255 A1 | 7/2007 | Johnson et al. |
| 2012/0183911 A1 | 7/2012 | Belsom |
| 2013/0174563 A1 | 7/2013 | Boardman et al. |
| 2014/0014638 A1* | 1/2014 | Artelsmair ............ B23K 9/126 219/130.01 |
| 2014/0226156 A1 | 8/2014 | Bergman et al. |
| 2014/0313506 A1 | 10/2014 | Bergman et al. |
| 2015/0283654 A1 | 10/2015 | Ernst |
| 2016/0003479 A1 | 1/2016 | Woods et al. |

FOREIGN PATENT DOCUMENTS

| | | |
|---|---|---|
| EP | 2626636 | 8/2013 |
| JP | 2016-215214 A | 12/2016 |
| WO | 2011/140646 A1 | 11/2011 |
| WO | 2014/126782 | 8/2014 |
| WO | 2015/031108 | 3/2015 |

* cited by examiner

SYSTEM AND METHOD TO LOCATE AND REPAIR INSERT HOLES ON A GAS TURBINE COMPONENT

FIELD OF THE INVENTION

The invention is in the field of repairing components on a gas turbine and other large industrial machines. For example, the invention may be directed to a method and system to repair openings for fuel nozzles in an end cover of a can-type combustion chamber on an gas turbine.

BACKGROUND OF THE INVENTION

An industrial gas turbine includes a combustor formed by a circular array of combustion chambers, which are also referred to as combustion cans. Each chamber has an end cover that includes openings which receive fuel nozzles that extend into a combustion zone internal to the chamber. The fuel nozzles must be securely seated in the openings in the combustion end covers to prevent leakage of hot combustion gases formed in the combustion zone.

Hot combustion gases, other fluids and vibrations in the gas turbine can cause wear and cracking to occur in the openings of the end covers. Wear on and cracking of the opening tends to occur where surfaces of the fuel nozzle abut interior surfaces of the opening. Wear and cracking of the interior surfaces of the opening that abut the fuel nozzle assembly can create gaps between the surface of the opening and the fuel nozzles. These gaps may allow combustion gases to leak through the end cover and mix with other gases flowing to the combustion can or to the atmospheric air.

To address the wear and cracking that occurs on their openings, end covers are periodically removed, such as every few years, from the combustion cans and the fuel nozzles are removed from the openings. The removed end covers are inspected and repaired.

Repair of the openings in the end cover includes adding replacement metal to the interior surfaces of the opening by manually brazing or welding metal inserts to those surfaces. Welding the inserts to the openings is described in U.S. Patent Application Publication 2016/0003479. The inserts and interior surfaces of the openings are machined to return the openings to their design dimensions. Manual welding and brazing of inserts is prone to human error and is time consuming.

While the end covers are removed, the gas turbine is shut down and does not generate power. Substantial costs are incurred due to the loss of power generation and the repair of the end covers, while a gas turbine and the end cover is repaired. To reduce the costs due to the repair of end covers, there is a long felt need to expedite the repair of end covers.

BRIEF SUMMARY OF INVENTION

A method has been invented and is disclosed here to repair an opening in a metallic device including: mounting the device on a positioner; while the device is mounted on the positioner, sensing and recording positions of a surface of an opening in the device and an outer aft (rear) surface of the end cover using a probe operated by a multi-axis manipulator; based on the recorded positions determining a centerline and diameter of the opening; orienting a digital model of the opening with respect to the opening of the device based on the centerline and diameter of the opening, and apply annular welds or cladding joints to the opening by a welding torch maneuvered automatically by the manipulator while the device is mounted to the positioner.

A method has been invented and is disclosed here to repair an end cover of a can-type combustor of a gas turbine comprising: remove an end cover from a combustor of a gas turbine and mount the end cover on a positioner; while the end cover is mounted on the positioner, sense and record positions of a surface of an opening in the end cover using a probe operated by a manipulator; based on the recorded positions determine a centerline and diameter of the opening; orient a digital model of the opening with respect to the opening of the end cover based on the centerline and diameter, and apply an annular weld to join an insert to the opening by a welding torch maneuvered automatically by the manipulator and based on the oriented digital model of the opening. The shape of the weld may be oval, square or rectangular, and may be shaped to have rounded corners. Also the weld need not be annular and may be shaped to fit the need to join the insert to the opening or apply cladding. The robotic guidance of the manipulator allows for the weld or cladding to be formed in a certain three dimensional shape with certain prescribed depths.

A system has been invented and is disclosed here that is configured to repair an end cover of a can-type combustor of a gas turbine comprising: an automated positioner supported on a floor of a workstation and including a fixture configured to support an end cover from a combustor of a gas turbine; an automated manipulator including articulating arms and a welding torch at a distal end of the arms, wherein the automated manipulator is above the floor and oriented to face an inside surface of the end cover; consumable welding wire extending a predetermined length from the welding torch; a computer controller that includes a non-transitory memory storing instructions and a processor which executes the instructions to: (i) sense and record positions of a surface of an opening in the end cover by manipulating the articulating arms to maneuvering the welding torch to touch a tip of the consumable welding wire to points on the surface; (ii) based on the recorded positions determine a centerline and diameter of the opening; (iii) orient a digital model of the opening with respect to the opening of the end cover based on the centerline and diameter, and (iv) maneuver the welding torch to apply an annular weld to join an insert to the opening or to apply cladding to a surface of the opening.

A method to repair an opening in a metallic device has been conceived and is disclosed herein that includes: mounting the device on a positioner; while the device is mounted on the positioner, sensing and recording positions of a surface, or multiple surfaces, either within, or on the surface of (or both), an opening in the device using a probe operated by a robot; based on the recorded positions determining necessary centerlines diameters, and/or shapes, at the surface of and/or within the opening; orienting a digital model of the opening with respect to the opening or inner dimensions of the device based on the centerlines, inner features, diameters (or any combination thereof) at or within the opening, and applying an annular weld or cladding to the opening surface or to the interior of the opening by a welding torch maneuvered automatically by the robot while the device is mounted to the positioner and based on the oriented digital model of the opening.

DETAILED DESCRIPTION OF THE INVENTION

Figure 1:
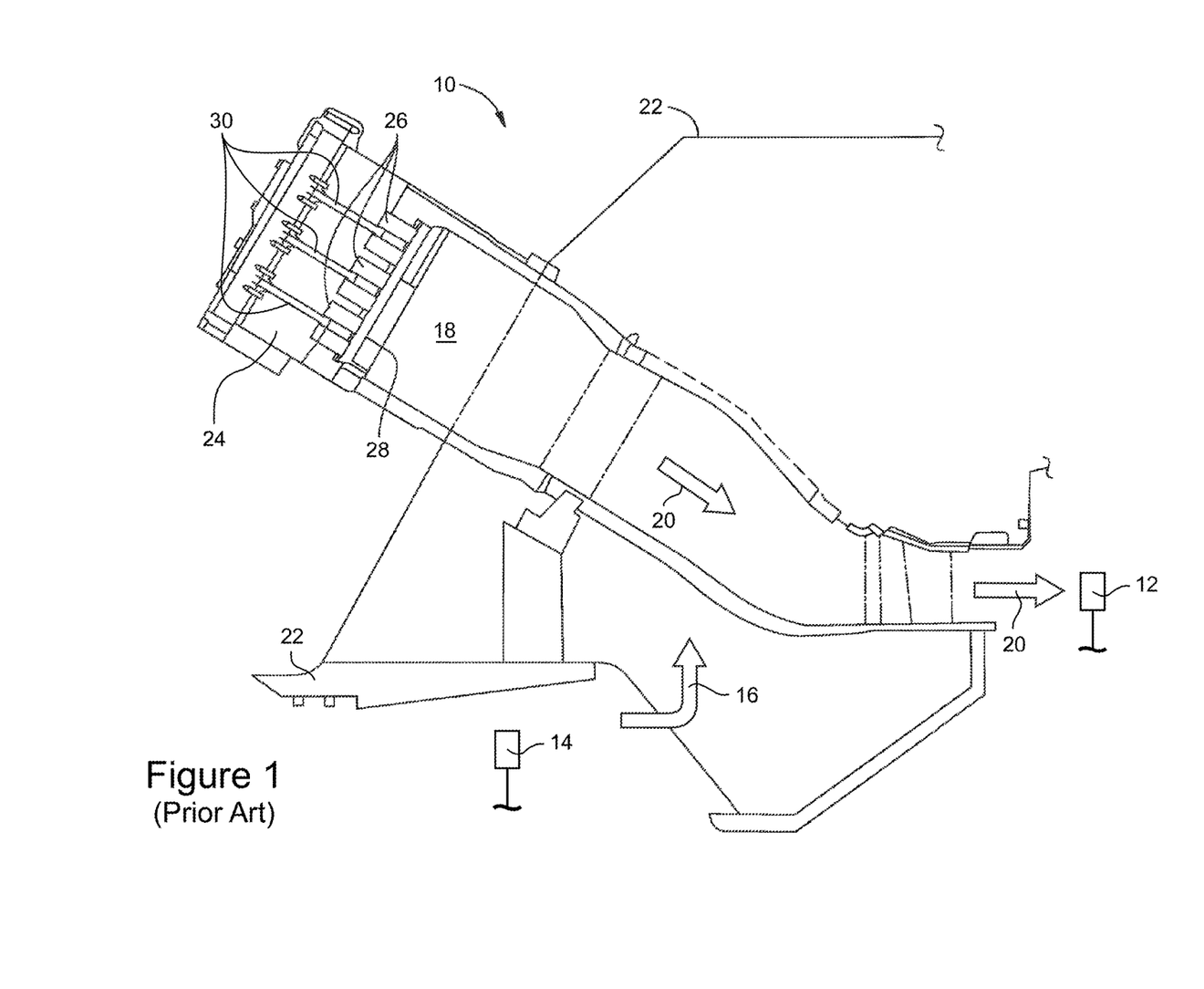
FIG. 1 is a schematic diagram of a conventional combustion can on an industrial gas turbine.

FIG. 1 shows a simplified cross-section view of a conventional combustion chamber 10, such as a combustion can, in an industrial gas turbine having an axial turbine 12 and an axial compressor 14. The combustion chamber 10 may be arranged with other combustion chambers in an annular array to form a combustor for the gas turbine. The combustion chambers may be used in can-annular type or can type combustors.

Each of the combustion chambers 10 receive compressed air 16 from the compressor 14, burns a mixture of compressed air and fuel in a combustion zone 18 in each chamber, and directs hot compressed combustion gases 20 to the turbine 12. Proper operation of the gas turbine requires that the hot combustion gases be confined by the combustion chamber 10 such that the gases flow into the turbine which drives the compressor and a power output shaft.

Leakage of combustion gas from the chamber 10 reduces the efficiency of the gas turbine. The combustion chambers 10 are mounted to a casing 22 of the gas turbine. The casing houses the compressor and turbine.

Each combustion chamber 10 includes an end cover 24 that seals an end of the combustion chamber opposite to the turbine 12. The end cover includes openings 30 that provide mounts for fuel nozzle assemblies 26 that inject fuel into the combustion zone.

An inside surface 28 of the end cover faces the combustion zone and may be exposed to the combustion gases in the combustion zone 18. The hot combustion gases in the combustion zone 18 apply extreme temperatures and pressures to the end cover and to the fuel nozzles mounted to the end cover. The end cover 24 provides a seal preventing the combustion gas mixing with outer gases or leaking from the combustion chamber to the atmosphere.

The openings 30 in the end cover can leak combustion gases when the contact surfaces become worn between the opening and the fuel nozzle assembly mounted in the opening. The present invention is directed to a method and system to repair the surfaces of openings to remove the wear and cracking, and return the opening to their design dimensions so that they may again provide suitable mounts for the fuel nozzle assembly.

Figure 2:
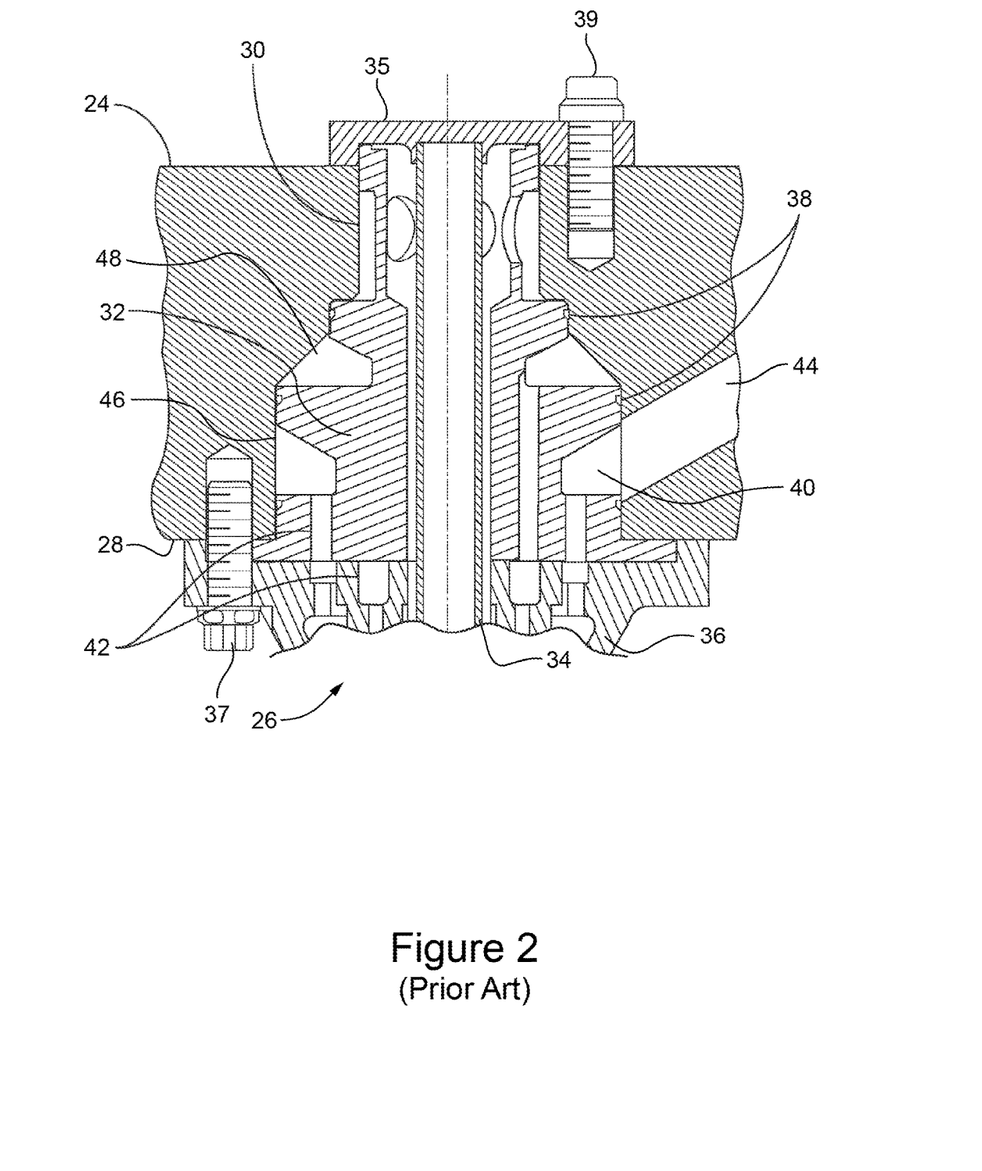
FIG. 2 shows in cross section an opening in an end cover and a portion of a fuel nozzle assembly in the opening.

FIG. 2 shows an enlarged cross-section view of a portion of the end cover 24 and, particularly, shows the openings 30 in the end covers that receive the fuel nozzle assemblies 26. The fuel nozzle assemblies may each include a fuel nozzle base 32 and fuel nozzle tubes 34. The base 32 is seated in the openings 30 of the end cover. The outer peripheral surfaces of the base abut regions of the interior surface of the opening 30.

The fuel nozzle base 32 supports the fuel nozzle tubes 34 and an annular casing mount 36. The fuel nozzle tubes 34 and casing mount 36 are fastened, such as by bolts 37, to the inside surface 28 of the end cover. A circular cap 35 seals the outer end of the insert to the outer surface of the end cap. The cap 35 is bolted 39 to the end cover. The fuel nozzle base 32 is sandwiched between the cap 35 and casing mount 36 and is thereby held securely in the opening 30 of the end cover.

The fuel nozzle base 32 is generally annular in cross section and has flanges 38, grooves 40 and passages 42 to direct fuel and other fluids supplied through passages 44 internal to the end cover to respective ones of the tubes in of the fuel nozzle tubes 34.

The openings 30 in the end cover have cylindrical steps 46 and sloped, annular corners 48 configured to receive the fuel nozzle base 32. The corners 48 are the regions of the opening at or adjacent the steps. Surfaces of the steps and corners in contact with the fuel nozzle base 32 tend to wear and crack due to fiction and vibration between the base and the surfaces of the opening. These surfaces are periodically repaired by removing the end cap, adding metal to the surfaces and machining the surfaces. Examples of the surfaces to be repaired are the joints 72, 74, 76 and 78 shown in FIG. 6.

Figure 3:
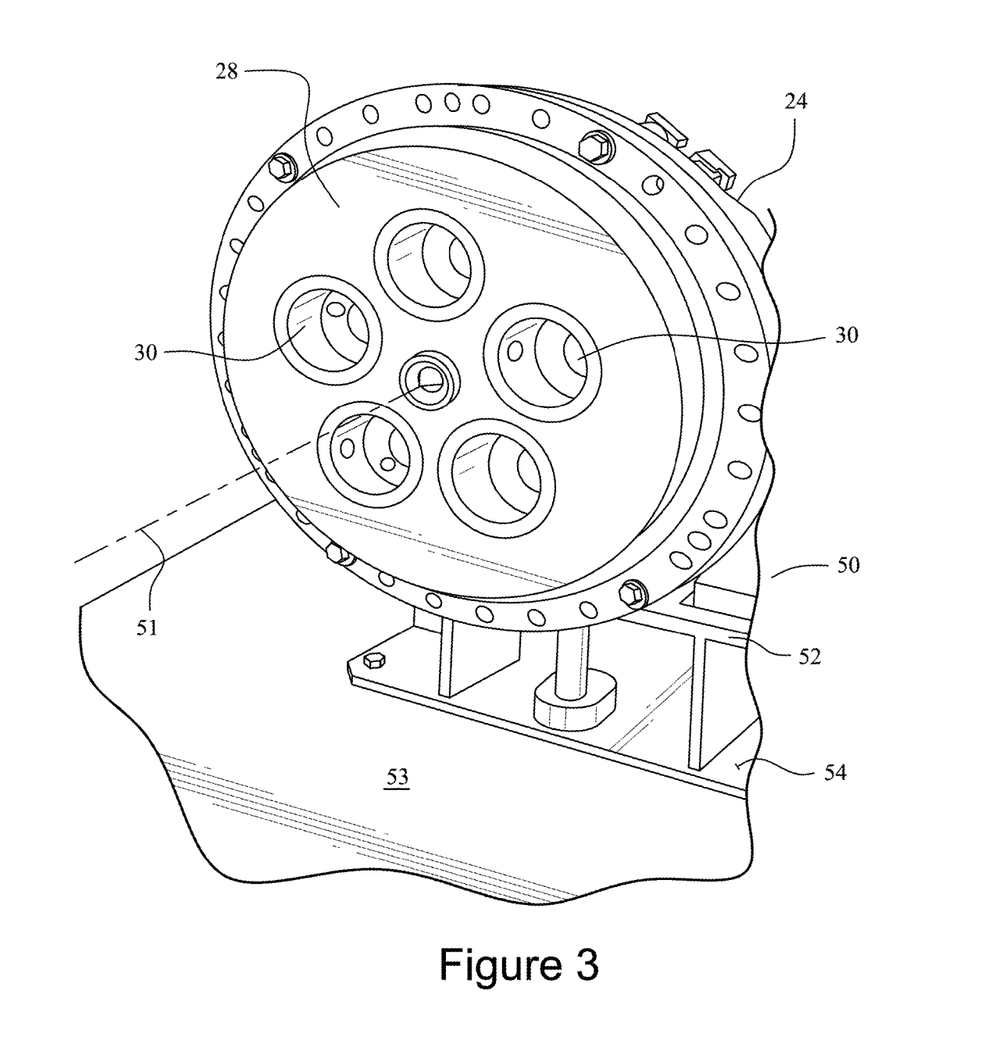
FIG. 3 is a perspective view of an end cover removed from the combustion can and mounted on a automated positioner.

FIG. 3 illustrates an end cover 24 that has been removed from a combustion chamber and moved to a workstation 50 and attached to a mount 52. The end cover 24 may have a diameter of two to four feet (0.6 to 1.3 meter), be formed of a metal and thus be heavy. The mount is sufficient to hold the end cover. The mount may include a floor stand 54 that is fixed, e.g., bolted, to the floor 53 to secure the position of the end cover with respect to the floor. The floor 53 is in a horizontal plane with respect to the workstation 50.

The inside surface 28 of the end cover 24 faces forward while the end cover is on the mount. The inside surface 28 of the end cover is perpendicular to the axis 51 of the end cover and to the horizontal plane of the floor 53. The orientation of the end cover in both a rotational position about the axis 51 and an angle with respect to the horizontal plane of the floor 53 may be adjusted by the workstation.

Figure 4:
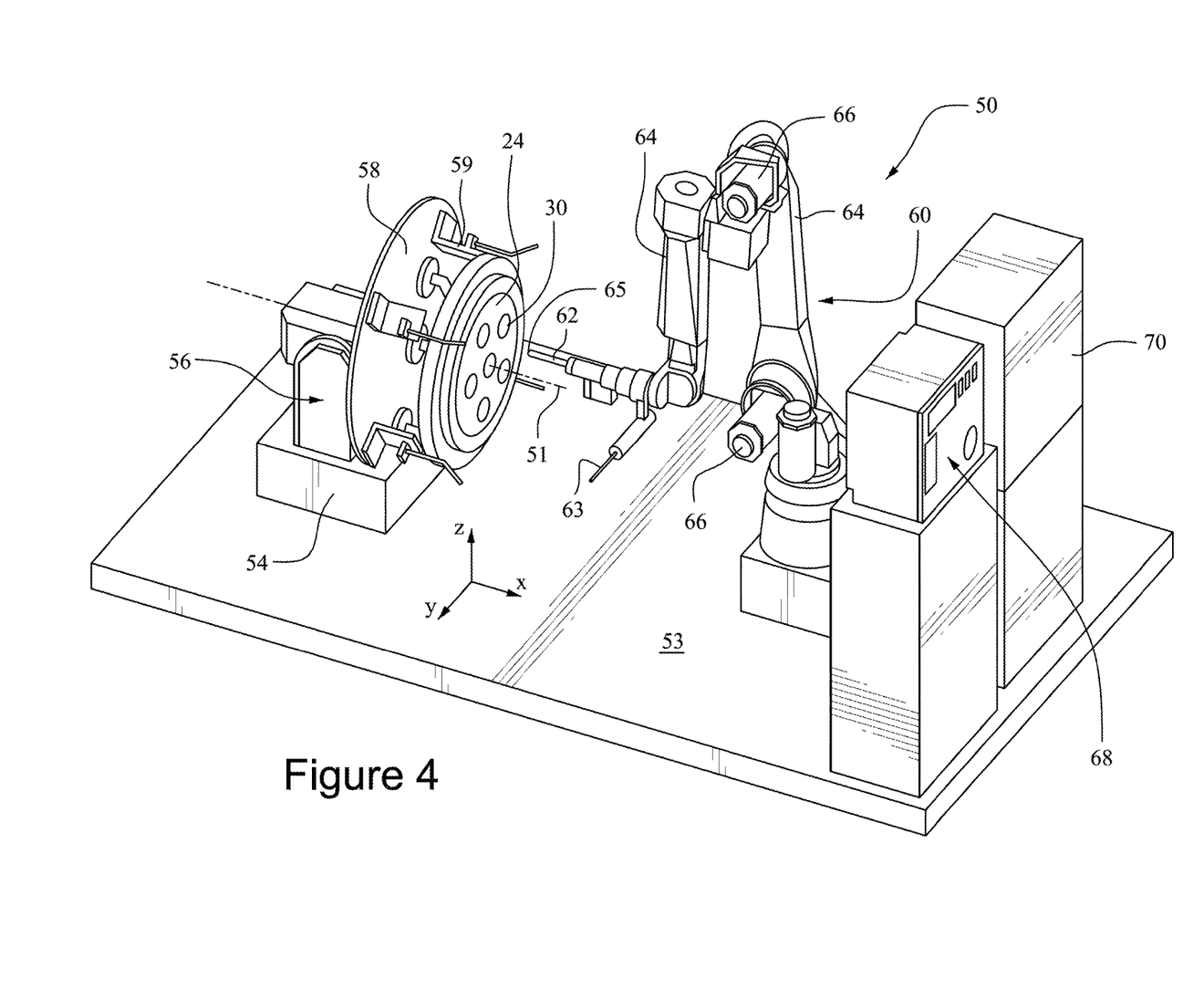
FIG. 4 is a perspective view of a robotic welding cell with the automated positioner supporting an end cover and a manipulator configured to operate a welding torch and other tools to work on the openings of the end cover.

FIG. 4 illustrates an exemplary arrangement of tools and mounts for the workstation 50. The end cover 24 is fixed to the floor 53 by the floor stand 54. The floor stand supports a positioner 56.

The end cover 24 is mounted directly to a circular mounting fixture 58 by datum locators 59, datum pins and other fasteners. The mounting fixture 58 is supported by and attached to the positioner 56 which is a motor controlled device configured to move the end cover with respect to the coordinate axes (X, Y and Z) of the workstation 50. The positioner 56 may be adapted to move the end cover 24 in multiple directions, such as rotating the end cover around the tilt axis 71 and rotating the end cover around its axis 51. The movement of the end cover 24 by the positioner may be used to align the end cover with a welding torch 62 and to orient the end cover for welding or cladding of the interior surfaces of the openings 30 in the end cover 24.

A manipulator 60, such as a robot, supports a welding torch 62 and a brush 63 at a distal end of articulating arms 64 of the manipulator. The distal end of the arms 64 face the end cover and maneuver the torch 62 or brush into the openings 30 in the end cover. The articulating arms 64 are moved by motors 66 and controlled by a controller 68.

The welding torch is maneuvered by the manipulator 60 into the openings 30 and to a surface of the opening to be welded or cladded. The manipulator moves the welding torch during a welding or cladding operation to provide a uniform and continuous weld or cladding on the interior surfaces of the opening.

A motorized brush 63, e.g. rotating brush, may also be mounted to the end of the arms 64 of the manipulator 60. The brush 63 may be used to clean the surfaces of the opening before and after welding or cladding of those surfaces.

The welding torch 62 may perform a cold metal transfer (CMT) welding process. The torch may have an electrode wire (such as a consumable welding wire) 65 that extends from the front nose of the torch 62. An electric current applied through the consumable welding wire 65 flows to a metal surface of the opening that is the target of the torch. Electrical heating occurs at the tip of the consumable welding wire 65 and the surface adjacent the consumable welding wire. The consumable welding wire may be an arc wire, and may be formed of material such as alloys including one or more of iron, nickel and cobalt.

The heating causes the metal at the tip of the consumable welding wire and the metal at the surface to melt and pool together. The metal from the tip is added to the metal of the surface to apply a cladding layer to the surface or to join, e.g., weld, the metal from the tip, surface and an insert 72, 74, 76 (FIG. 6) adjacent the surface of the opening. Electrical power is applied to the welding torch from a welding power source 70.

Figure 5:
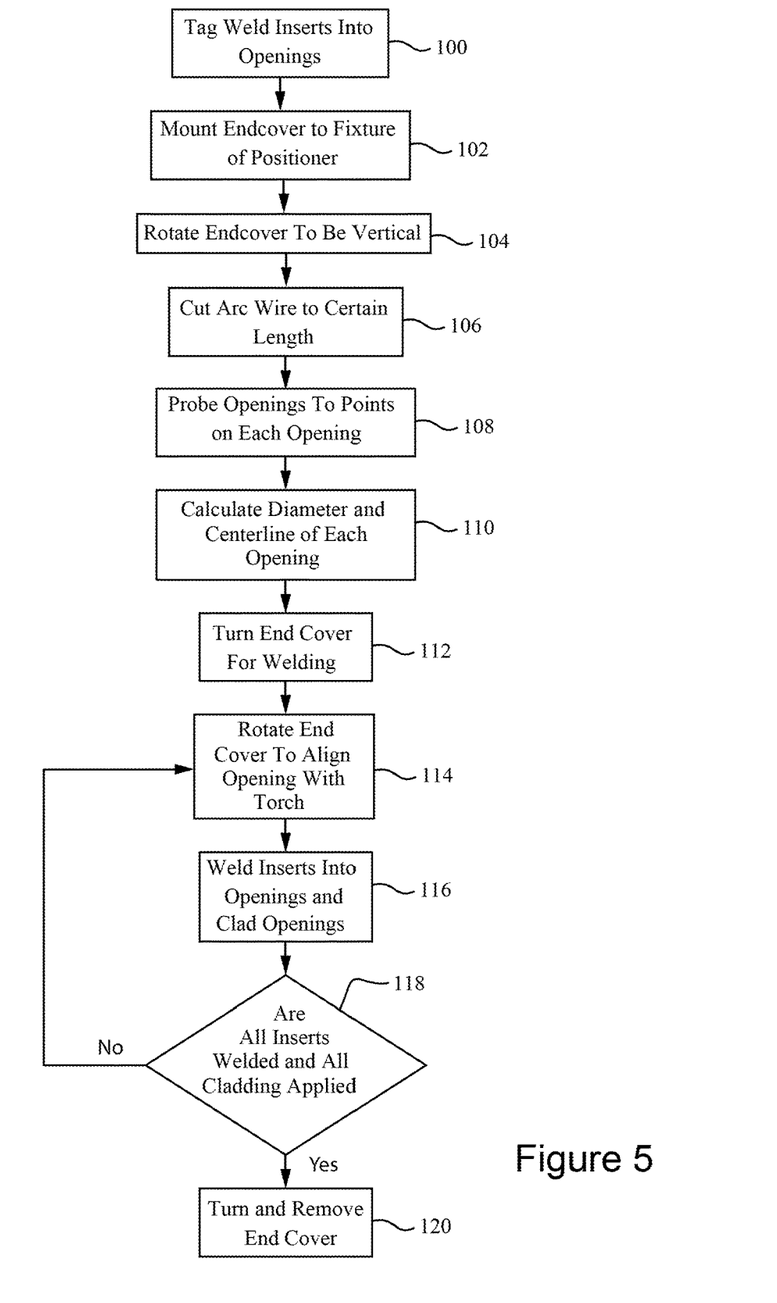
FIG. 5 is a flow chart of an exemplary automated method to precisely locate the openings on an end cover at the machining station, weld inserts into the openings and clad surfaces of the opening.

FIG. 5 is a flow chart of an exemplary process for applying metal cladding to the openings 30 of an end cover or for welding metal inserts into the openings. After the end cover 24 is removed from the gas turbine, annular inserts are applied to the openings, in step 100. The inserts may be manually tag welded by spot welding the outer edge of an insert to the opening at a desired position in the opening. The tag welding holds the insert 72, 74, 76 in the opening until the welding torch 62 applies a uniform weld around the entire rim of the insert and surface of the opening 30.

Figure 6:
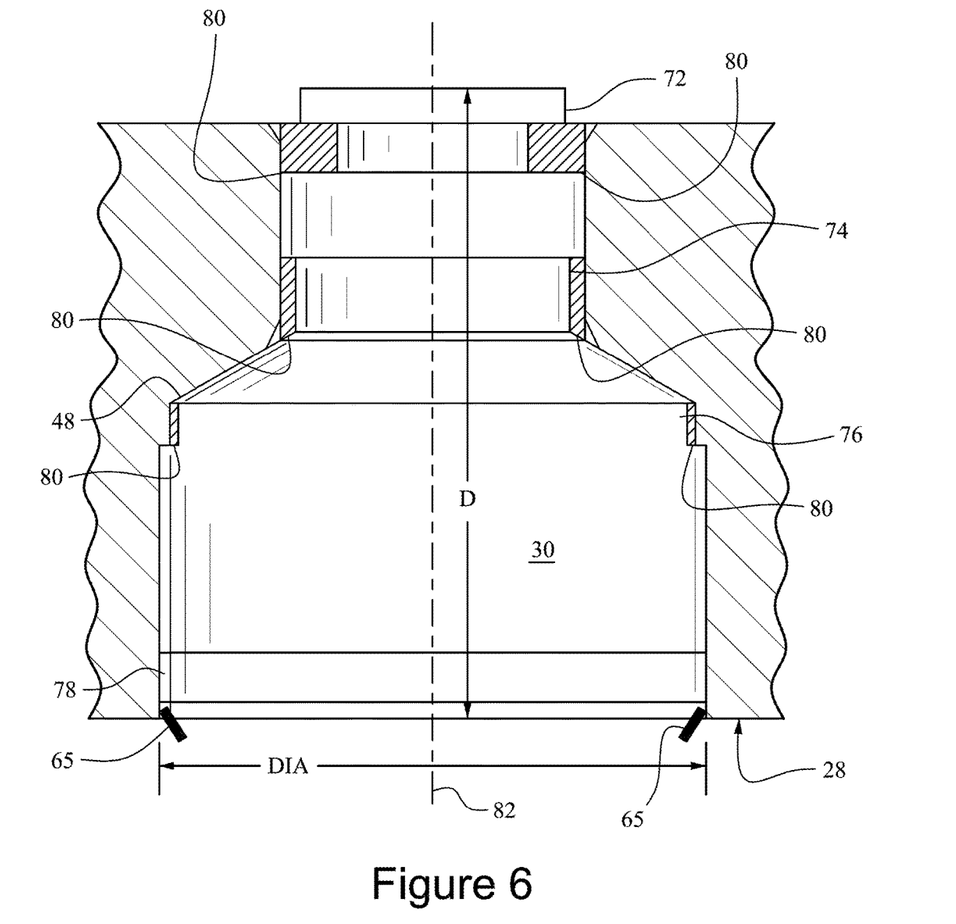
FIG. 6 shows in cross section an opening in an end cover with inserts and cladding added to surfaces of the opening after the machining to certain dimensions, such as the dimensions prescribed in the drawings or specification for the opening.

FIG. 6 is a view of an opening 30 in cross section and shows the inserts 72, 74 and 76 applied to the openings 30. The inserts may be metallic and annular. The inserts are inserted as locations along the depth (D) of the opening 30 that correspond to locations on the surface of wear and cracking during operation of the gas turbine. The inserts may be inserted adjacent corners in the openings and where components of the fuel nozzle abut against the surfaces of the openings. The inserts 72, 74 and 76 provide replacement metal to be used to rebuild the surfaces of the openings 30 to their original dimensions and thereby repair the wear and cracking that occurs on the surfaces of the openings.

In step 102 shown in FIG. 5, the end cover 24 is mounted to the fixture 58 of the positioner 56. The fixture 58 may be horizontal at which position the tilt axis of the fixture is zero degrees and the axis 51 of the end cover is vertical. The end cover is fastened to the fixture such as with datum locators, pins, and bolts. In step 104, the positioner orients the end cover to face the welding torch. The orientation may turn the end cover such that its axis is 90 degrees which is horizontal with the floor of the workstation.

The positioner may hold the end cover at a fixed position with respect to the floor of the workstation. At this fixed position, the positioner may rotate the end cover around its axis 51 during the process of welding the inserts to the openings and applying cladding to the openings. The positioner tracks the rotational position of the end cover as provides information regarding the rotational position to the controller for the manipulator (or other control system). The positioner may also provide positional information to the manipulator regarding the position of the end cover with respect to the floor of the work station or the manipulator, such as with respect to the X, Y and Z coordinates of the end cover in a Cartesian coordinate system or by joint positions of axis of the positioner.

In step 106, the consumable welding wire extending from the torch is cut, extended or otherwise set to a predetermined length. Setting the consumable welding wire to a predetermined length from the tip of the torch enables the controller 68 to precisely determine the location of the tip with respect to the end cover and with respect to a Cartesian coordinate system.

In step 108, the manipulator 60 moves under control of the controller to probe the inside surface 28 of the end cover 24 and the openings in the end cover. The controller may automatically maneuver the torch into each opening to determine a diameter (DIA in FIG. 6) of the opening 30 and a centerline 82 of the opening.

To determine a diameter DIA and centerline 82 of an opening 30, the manipulator 60 moves the torch until the distal tip of the consumable welding wire 65 touches the end cover, such as the end surface 28. A sensor monitors the wire to determine when the touch occurs. For example, a conductivity sensor, e.g., voltage or current meter, detects an abrupt change in conductivity which indicates that the tip of the wire is at a surface of the metallic end cover. To avoid deforming the wire, the manipulator moves the consumable welding wire and welding torch slowly and stops when the sensor indicates that the wire touches the end cover.

Mechanical poka-yoke system and the datum pins, locators and fixing bolts on the fixture ensure that the end covers are referenced repeatedly on the fixture so that approximate positions of the openings are taught to the manipulator. In this way, the manipulator learns how to best approach the openings in the end cover to precisely locate each opening.

The manipulator moves the tip of the consumable welding wire 65 to determine locations on the perimeter of the opening as shown in FIG. 6. The manipulator determines the locations on the perimeter of the opening in the Cartesian coordinate system (X, Y and Z) of the workstation. By using the consumable welding wire 65 as a locating probe tip, the manipulator and controller map the inside surface and determine the location of one or more of the openings 30 in the end cover 24.

By maneuvering the tip of the consumable welding wire 65 across the inside surface 28 of the end cover 24 and the perimeter of an opening, e.g., inside surface of the opening, the manipulator 60, positioner 56 and controller 68 generate and collect data that indicates the location of the openings in the real world space of the end cover or any of manipulator's coordinate systems. The real world space may be defined by an X, Y and Z and w, p and r (rotations) Cartesian coordinate system in which each point/position in the real space can be determined and stored electronically by the controller 68.

Then controller 68 calculates the location of the plane on the inside surface 28 of the end cover 24. The controller also the center, center line vector and the diameter of each of the openings. The calculations of the location of the plane of the inside surface, the center, centerline vector and/or diameter of each opening. To detect the centerline of the opening, a center point on a surface of the opening and the diameter of the opening, measuring systems may be used such as mechanical tracing or tactile tip, gauges or indicators, or articulated arms or an optical system such as those that employ photogrammetry techniques or a laser scanner or tracker or displacement sensors or other structured light or camera.

By locating positions on a surface of the opening 30 with respect to the Cartesian coordinate system, the positions can be represented as electronic data stored by the controller 68. The data indicating locations on the surface of the opening may corresponds to location on the rim (see wire tip 65 in FIG. 6) of an opening. The data is stored in a non-transitory memory of the controller 68 and is used to calculate the diameter DIA and centerline 82 of an opening.

The controller 68 may automatically calculate the diameter and centerline of an opening based on the location data obtained using the manipulator and consumable welding wire 65. As an alternative to the consumable welding wire, the manipulator may include a touch sensitive probe or other device to use to determine the locations on the surface of an opening which is used to calculate the diameter and centerline of an opening. The probe may be any of a mechanical touch probe sensor, a laser sensor, a non-contact sensor or a proximity sensor.

The controller 68 determines and stores the position of the tip of the consumable welding wire at each point where the conductivity sensor determines that the wire touches the end cover and, particularly, a surface or rim on the opening. In step 110, the controller 68 determines the centerline and diameter of each of the openings based on the positional data collected from the positioner. Knowing the locations of points on the surface, e.g., rim, of the opening provides the controller with sufficient information to determine the diameter DIA and centerline 82 of each opening. The rim of the opening may be at the intersection of the opening and the insider surface 28 of the end cover.

For example, data indicate the rim of an opening, such as at three or more points on the rim, may be used to statistically fit a circle to the data for the perimeter. Knowing the fitted circle allows the controller to determine a diameter of the circle and a center point of the circle. Knowing the diameter and location of a center point of the circle with respect to the Cartesian coordinate system (X-Y-Z, and w,p,r enables the controller to determine the location of each of the openings on the end cover.

The controller 68 compares the stored information about the calculated diameter and centerline of each opening 30 to a digital model, e.g., a three dimensional model, of the end cover or of an opening for the end cover. The digital model includes the design dimensions and tolerances of the design dimensions for the opening and may include design dimensions of the end cover, such as the location of the openings 30 on the inside surface 28 of the end cover. The digital model may be a three dimensional computer aided design (CAD) model of the openings of the end cover and at least a portion of the end cover sufficient to locate the openings in the end cover. The controller uses the model and the known centerlines and diameter of one or more of the openings in the end cover to determine the locations of the surface features on each of the openings on the end cover mounted to the fixture 58.

The comparison between the digital model of the opening and the calculated diameter and centerline position of the opening allows the controller 68 to determine precisely the location and orientation of the opening with respect to the Cartesian coordinates of the workstation and to determine the positions of locations on the surface of the opening. Thus, using the stored information about the diameter and centerline positions of each opening and the digital model of the end cover, and particularly the intended shape of each opening, the controller can determine the location of each opening and, particularly, the position of each point on the surface of the opening.

Knowing the locations of the surface of the openings in the end cover mounted to the fixture, the controller 68 maneuvers the welding torch 62 to cause the consumable welding wire 65 to form a continuous welded seam between each of the inserts and the opening, and to apply cladding in an annular ring to build up the surface metal on the openings. For example, the torch 62 may form uniform and continuous welds in a ring around the perimeter of an insert and the surface of the opening. Also, the welding torch 62 may apply cladding to an annular region of the opening which does not have an insert. The torch applies metal cladding deposited from the consumable welding wire to the annular region.

The weld and cladding may be formed automatically under computer control of the controller 68. During the welding or cladding process, the controller also moves the articulating arms 64 of the manipulator 60 to cause the consumable welding wire 65 and torch 62 to move in a circle around the insert and opening. The movement may be at a uniform speed so that a uniform and continuous weld or cladding is applied to the opening.

In step 112, the positioner 56 turns the end cover such that the inside surface 28 of the end cover 24 is horizontal and the axes 51 of the openings 30 are vertical. Having the end cover horizontal may be advantageous for welding inserts into the opening. However, some applications may orient, e.g., tilt, the end cover at an angle other than zero with respect to a horizontal plane. For example, applying cladding an opening or welding an insert to an opening may be best performed with the end cover at an angle, such as 30 degrees, with respect to the cell floor plane to achieve a good welding angle of the torch. To achieve that desired angle between the torch and the opening may require the end cover to be tilted to an angle other than horizontal.

In steps 114, 116 and 118, the controller 68 may sequence the welding of the inserts and the application of cladding. In step, 114, the positioner 56 rotates the end cover 24 about its axis 51 to align a selected opening with the torch 62. In step, 116 the welding torch welds an insert or applies cladding to one ring in an opening.

After welding an insert or applying cladding at one location on an opening, the controller 68 checks whether all welds or cladding are completed in all openings in step 118. If there are more inserts to weld or cladding to apply, the end cover may be turned in step 114 to align the welding torch to another opening. The welding torch may not remain at one opening to form each of the welds and the cladding before moving to another opening. By moving the weld torch to a different opening after each weld or cladding operation, the openings do not unduly deform or the surface treatment on the opening deteriorates due to excessive heating. The sequence of openings to which the welding torch is moved after each weld or cladding operation, may be to move the torch to another opening that is not adjacent the opening that just received the weld or cladding.

To orient the welding torch to each opening, the end cover may be turned, by the positioner, about its axis 51 by the positioner 56 to align the new opening to be welded with the torch 62. The end cover may also be tilted to orient the opening properly for welding or cladding with respect to a horizontal plane. Further, the positioner may maneuver the end cover into engagement with the welding torch, as an alternative or in addition to the welding torch being maneuvered by a manipulator.

The torch is maneuvered into position adjacent a selected insert and the opening aligned with the torch. The torch is maneuvered by moving the articulating arms 64 by operation of the motors 66 under control of the controller 68 for the manipulator 60. The arms move the tip of the consumable welding wire 65 to the gap between the rim of the selected insert and a sidewall of the opening. Electrical power is applied to the torch and consumable welding wire by the welding power source 70. The current flowing through the torch and the insert and opening causes metal from the tip to flow into the gap between the insert and the opening and form a weld that joins the insert and the opening.

An opening 30 might be excessively heated if the weld torch remains continuously in an opening while welding each of the three inserts and applying cladding to a fourth annular region of the opening. Moving the welding torch to a different opening after each insert is welded or after a ring of cladding is formed reduces the risk of overheating an opening because the weld torch is never too long in any one opening. To minimize distortions, the welding torch might move in a star shaped pattern from one opening to the other between the welding or cladding passes. The number of passes by the welding torch for each insert and cladding depends on the welding parameters and the desired joint geometry.

The steps 114, 16 and 118 are repeated until all inserts are welded in each of the openings and cladding is applied to the openings as desired. When the welds and cladding are completed, the end cover is removed from the positioner in step 120. Alternatively, other machining tools may be applied to the inserts to remove metal to return the openings to their desired shapes. For example, a milling machine or drill may be used to remove metal from the welded insert and cladding until the dimensions of the opening are within tolerances for the design dimensions of the opening.

FIG. 6 is a cross sectional view of an opening 30 with inserts 72, 74 and 76 and cladding 78. The inserts are welded 80 along their upper rims to the opening. The welds 80 and cladding 78 are formed by the torch during steps 114 and 116. The welds 80 and cladding 78 may be applied automatically by the welding torch and positioner. The automatic operation of the welding torch and positioner promotes uniform and continuous welds between inserts and openings and a uniform and continuous cladding applied to the surface of the opening. Further, the automatic operation of steps 104 to 118 may be performed quickly, such as in two to three hours per end cover, as compared to a manual operation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to repair an opening in a metallic device comprising:

mount the metallic device on a positioner;

while the metallic device is mounted on the positioner, sense and record positions of a surface of an opening in the metallic device using a probe operated by a manipulator, wherein the probe and/or the metallic device move relative to the other, and the sensing includes the probe being moved to touch each of the positions on the surface of the opening to record each of the positions;

based on the recorded positions determine at least one of a centerlines of the opening, a center point on the inner surface of the opening and a diameter of the opening;

orient a pre-existing digital model of the opening with respect to the opening of the metallic device based on at least one of the centerline, a center point and the diameter of the opening, wherein the pre-existing digital model of the opening exists before the metallic device is mounted on the positioner, and apply weld joints or cladding joints to the opening by a welding torch by maneuvering the metallic device and/or the welding torch automatically and while the metallic device is mounted to the positioner, wherein the maneuvering is guided by the oriented digital model of the opening.

2. The method of claim 1 wherein the probe includes a consumable welding wire extending from the welding torch and the sensing of the positions is determined based on conductivity between a tip of the consumable welding wire and the surface of the opening.

3. The method of claim 2 further comprising adjusting a length of the consumable welding wire extending from the welding torch to a certain length before using the consumable welding wire to sense the positions.

4. The method of claim 1 further comprising, after the application of the weld or cladding joint in the opening, rotating the metallic device to align another opening with the welding torch and applying another weld or cladding joint to another location on the surface of the another opening.

5. The method of claim 4 wherein the rotation of the metallic device is performed after the application of the weld or cladding joint in the opening and before the application of another weld or cladding joint in the opening.

6. The method of claim 5 wherein the another opening is in the metallic device which is separated from the opening by a third opening.

7. The method of claim 1 wherein the probe is at least one of a mechanical touch probe sensor, a laser sensor, a non-contact sensor and a proximity sensor.

8. The method of claim 1, wherein the metallic device is an end cover for a combustor of a gas turbine.

9. The method of claim 1, wherein the manipulator is a multi-axis manipulator.

10. The method of claim 1, wherein the manipulator is a robot manipulator.

11. A method to repair an end cover of a can-type combustor of a gas turbine comprising:

remove an end cover from a combustor of a gas turbine and mount the end cover on a positioner;

while the end cover is mounted on the positioner, sense and record positions of a surface of an opening in the end cover using a probe operated by a manipulator, wherein the sensing includes the probe moving to touch each of the positions on the surface of the opening to record each the positions;

based on the recorded positions determine at least one of a centerline of the opening, a center point on an inside surface of the opening, and a diameter of the opening;

orient a pre-existing digital model of the opening with respect to the opening of the end cover based on at least one of the centerline, the center point and the diameter, wherein the pre-existing digital model existed before the removal of the end cover, and apply a weld to join an insert to the opening by a welding torch maneuvered automatically by the manipulator and based on the oriented digital model of the opening.

12. The method of claim 11 further comprising applying cladding to an annular surface of the opening by the welding torch.

13. The method of claim 11 wherein the probe is a consumable welding wire extending from the welding torch and the sensing of the positions is determined based on conductivity between a tip of the consumable welding wire and the surface of the opening.

14. The method of claim 13 further comprising adjusting a length of the consumable welding wire extending from the welding torch to a certain length before using the consumable welding wire to sense the positions.

15. The method of claim 11 further comprising, after the application of the weld in the opening, rotating the end cover to align another opening in the end cover with the welding torch and applying another weld or cladding to another location on the surface of the another opening.

16. The method of claim 15 wherein the rotation of the end cover is performed after the application of the weld in the opening and before the application of another weld in the opening.

17. The method of claim 16 wherein the another opening is an opening in the end cover which is not adjacent to the opening.

18. The method of claim 16 wherein the welding torch is moved in a star shaped pattern as the torch moves to the openings of the end cover.

19. The method of claim 11, wherein the manipulator is a multi-axis manipulator.

20. The method of claim 11, wherein the manipulator is a robot manipulator.

* * * * *

UNITED STATES PATENT AND TRADEMARK OFFICE
CERTIFICATE OF CORRECTION

PATENT NO. : 10,399,187 B2
APPLICATION NO. : 15/427894
DATED : September 3, 2019
INVENTOR(S) : Yuvalaklioglu et al.

It is certified that error appears in the above-identified patent and that said Letters Patent is hereby corrected as shown below:

In the Specification

Column 4, Line 65, change "brush" to --brush 63--

Column 5, Line 47, change "adjacent corners" to --adjacent corners 48--

Signed and Sealed this
Twenty-second Day of October, 2019

Andrei Iancu
*Director of the United States Patent and Trademark Office*